(12) United States Patent
Tounosu et al.

(10) Patent No.: US 11,309,773 B2
(45) Date of Patent: Apr. 19, 2022

(54) SYSTEM AND METHOD FOR MONITORING TEMPERATURE OF ROTATING ELECTRIC MACHINE

(71) Applicant: Mitsubishi Heavy Industries, Ltd., Tokyo (JP)

(72) Inventors: Shigeki Tounosu, Yokohama (JP); Kengo Iwashige, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 328 days.

(21) Appl. No.: 16/668,908

(22) Filed: Oct. 30, 2019

(65) Prior Publication Data

US 2020/0144896 A1   May 7, 2020

(30) Foreign Application Priority Data

Nov. 2, 2018   (JP) .............................. JP2018-207049

(51) Int. Cl.
*H02K 11/25*   (2016.01)
*H02K 9/04*   (2006.01)
*H02K 1/16*   (2006.01)
*H02K 9/08*   (2006.01)

(52) U.S. Cl.
CPC ............. *H02K 11/25* (2016.01); *H02K 1/165* (2013.01); *H02K 9/04* (2013.01); *H02K 9/08* (2013.01)

(58) Field of Classification Search
CPC .......... H02K 11/25; H02K 1/165; H02K 9/04; H02K 9/08
USPC ....................................................... 310/68 C
See application file for complete search history.

(56) References Cited

U.S. PATENT DOCUMENTS

| 4,602,872 A | * | 7/1986 | Emery | .................. G01K 1/026 374/152 |
| 2011/0241458 A1 | * | 10/2011 | Rai | ......................... H02K 9/08 310/53 |

FOREIGN PATENT DOCUMENTS

| EP | 2420809 A2 | * | 2/2012 | ............. G01K 11/32 |
| JP | 06-315247 A |   | 11/1994 | |
| JP | 2001-091601 A |   | 4/2001 | |
| JP | 2011-223866 A |   | 11/2011 | |
| JP | 2014-025753 A |   | 2/2014 | |
| JP | 2018117462 A | * | 7/2018 | |

(Continued)

*Primary Examiner* — Jose A Gonzalez Quinones
(74) *Attorney, Agent, or Firm* — Volpe Koenig

(57) ABSTRACT

A system and method for monitoring temperature and detecting a temperature rise of a rotating electric machine with high accuracy. A temperature monitoring system for a rotating electric machine includes: sensor data storage that stores values measured by an in-coil temperature sensor and a physical quantity sensor in the rotating electric machine; an in-machine temperature predictor that predicts a temperature by use of the value measured by the physical quantity sensor; a strand temperature calculator that calculates a relationship between a temperature of the strand and a temperature measured by the in-coil temperature sensor, based on the predicted temperature; and a strand temperature predictor that predicts a temperature of the strand from the value measured by the in-coil temperature sensor, and from the relationship between a temperature of the strand and a temperature measured by the in-coil temperature sensor calculated by the strand temperature calculator.

14 Claims, 6 Drawing Sheets

(56) References Cited

FOREIGN PATENT DOCUMENTS

JP            2018129967 A * 8/2018
WO     WO-2015170393 A1 * 11/2015  ............. H02K 15/00

* cited by examiner

SYSTEM AND METHOD FOR MONITORING TEMPERATURE OF ROTATING ELECTRIC MACHINE

CLAIM OF PRIORITY

The present application claims priority from Japanese Patent application serial No. 2018-207049, filed on Nov. 2, 2018, the content of which is hereby incorporated by reference into this application.

TECHNICAL FIELD

The present invention relates to a system and a method for monitoring temperature of a rotating electric machine.

BACKGROUND OF THE INVENTION

In general, in rotating electric machines such as a turbine generator and the like, due to Joule loss, copper loss or the like, a coil, a core and/or the like produces heat to cause a temperature rise in the machine. The temperature rise is conventionally monitored and controlled to diagnose or prevent deterioration of the rotating electric machine, to predict the lifetime, and the like. A structure for the rotating electric machine is also known, in which a ventilation passage is provided in a stator and/or a rotor so that air or hydrogen as a cooling medium circulates through the ventilation passage to cool the coil, the core or/and the like.

For example, Japanese Unexamined Patent Application Publication No. 2011-223866 discloses a system for monitoring a reduction in flow rate of coolant for use in a rotating electric machine having stator coils placed in a plurality of slots in a stator, the stator coils being cooled by coolant flowing through a plurality of passages formed in the stator coils. The system includes: an exit temperature sensor that measures a coolant exit temperature of the coolant at at least one of exits of the plurality of passages, and outputs a signal indicative of each coolant exit temperature; a slot temperature sensor that measures a temperature in at least one slot at a position along a length of the at least one slot and on the outside of the stator coil in the at least one slot, and outputs a signal indicative of the temperature in the at least one slot; an entrance temperature sensor that measures a coolant entrance temperature of the coolant at an entrance to the plurality of passage, and outputs a signal indicative of the coolant entrance temperature; and a coolant flow reduction monitoring apparatus that generates an alarm indicating a reduction in flow rate of the coolant on the basis of at least one coolant passage temperature, at least one slot temperature and a coolant entrance temperature.

Japanese Unexamined Patent Application Publication No. Hei 6-315247 discloses a cooling-medium temperature monitoring scheme for a rotating electric machine, in which a stator coil is cooled by flowing a cooling medium through a cooling medium passage mounted in the stator coil, and the temperature of the cooling medium is monitored by measuring the temperature of the cooling medium at an exit of the cooling medium passage. In the cooling-medium temperature monitoring scheme, the cooling medium temperature at the exit of the cooling medium passage is measured for each stator coil; a temperature difference between/among each two or more temperatures measured is determined; a difference of the temperature difference and a standard temperature difference pre-obtained in a normal operating state is determined; and, when the difference between the temperature differences exceeds a pre-set warning value, an alarm is produced.

Japanese Unexamined Patent Application Publication No. 2014-25753 discloses a deterioration diagnostic apparatus for a vehicle-mounted rotating electric machine including: a temperature detecting section that detects a coil temperature of the rotating electric machine mounted on a vehicle; a storage section that stores an estimated lifetime at a predetermined temperature of the rotating electric machine which is pre-measured; and a computing section that acquires data on coil temperature detected by the temperature detecting section in association with use of the rotating electric machine, and performs summation of operating times corresponding to the predetermined temperature of the estimated lifetime, based on Arrhenius law to determine a deterioration condition for the estimated lifetime.

Japanese Unexamined Patent Application Publication No. 2001-091601 discloses a rotating electric machine having a stator with stator coils incorporated into slots arranged in the core inner periphery. In the rotating electric machine, an optical fiber temperature sensor is installed on the surface of an insulating layer in a coil end portion located outside the slot of at least one of the stator coils, the optical fiber temperature sensor including: a temperature-sensitive member varying characteristics depending on temperature; and an optical fiber transmitting light between the temperature-sensitive member and an external light source.

SUMMARY OF THE INVENTION

However, those patent applications do not disclose prediction of a temperature of the strand having a highest temperature within the coil, and therefore degradation of the insulating layer forming part of the coil is incapable of being detected exactly.

The present invention has been made in view of the above respects and it is an object of the invention to provide a system and a method for monitoring temperature of a rotating electric machine which are capable of detecting a temperature rise within the rotating electric machine with high accuracy to achieve further advanced ensuring of product reliability.

To achieve the object, an aspect of the present invention provides a system for monitoring temperature of a rotating electric machine, including: a coil that has a strand for passing a current through the coil forming part of the rotating electric machine, and an insulating layer placed around the strand; an in-coil temperature sensor that is placed within the coil; a physical quantity sensor that is placed within the rotating electric machine and measures a physical quantity related to operation of the rotating electric machine; a sensor data storage that stores values measured by the in-coil temperature sensor and the physical quantity sensor; an in-machine temperature predictor that predicts a temperature inside the rotating electric machine by use of the value measured by the physical quantity sensor and stored in the sensor data storage; a strand temperature calculator that calculates a relationship between a temperature of the strand and a temperature measured by the in-coil temperature sensor, on the basis of the temperature inside the rotating electric machine predicted by the in-machine temperature predictor; and a strand temperature predictor that predicts a temperature of the strand from the value measured by the at least one in-coil temperature sensor and stored in the sensor data storage, and from the relationship between a temperature of the strand and a temperature measured by the in-coil temperature sensor calculated by the strand temperature calculator.

Also, to achieve the above object, another aspect of the present invention provides a method for monitoring temperature of a rotating electric machine, including the steps of: measuring a temperature by an in-coil temperature sensor that is installed in a coil having a strand for passing a current through the coil forming part of the rotating electric machine, and an insulating layer placed around the strand; measuring a physical quantity related to operation of the rotating electric machine, by a physical quantity sensor that is placed within the rotating electric machine; predicting a temperature inside the rotating electric machine using a value measured by the physical quantity sensor; calculating a relationship between a temperature of the strand and a temperature measured by the in-coil temperature sensor, on the basis of the temperature inside the rotating electric machine predicted; and predicting a temperature of the strand from the temperature measured by the in-coil temperature sensor, and from the relationship between a temperature of the strand and a temperature measured by the in-coil temperature sensor, the relationship being calculated.

Further specific configurations according to the present invention will be described in the scope of claims.

According to the present invention, a system and a method for monitoring temperature of a rotating electric machine are able to be provided, which are capable of detecting a temperature rise within the rotating electric machine with high accuracy to achieve further advanced ensuring of product reliability.

The above and other problems, features and advantages of the invention will be more apparent from a description of the following embodiments.

DETAILED DESCRIPTION

Figure 11:
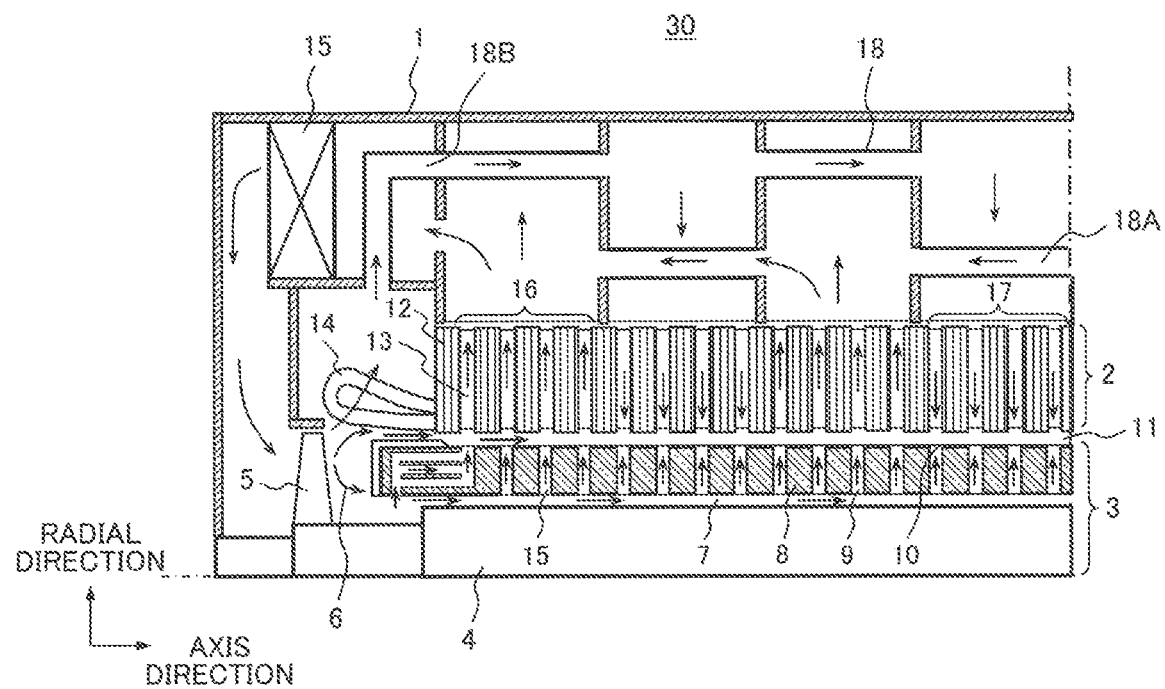
FIG. 11 is a sectional view illustrating a part of the structure overview of a turbine generator including a radial flow cooling rotor.

Conventional Systems and Methods for Monitoring Temperature of Rotating Electric Machine Prior to a description of a temperature monitoring system and a temperature monitoring method for a rotating electric machine according to the present invention, a description is given of a conventional temperature monitoring systems and a conventional temperature monitoring method. FIG. 11 is a sectional view illustrating a part of the structure overview of a turbine generator including a radial flow cooling rotor.

In FIG. 11, a turbine generator 30 has a stator frame 1, a stator 2 housed in the stator frame 1, a rotor 3 placed facing the stator 2, and a rotor shaft (shaft) 4 rotating integrally with the rotor 3. An air gap (interstice) 11 exists between the inner peripheral surface of the stator 2 and the outer peripheral surface of the rotor 3. A field coil 8 is installed as a current carrying conductor of the rotor 3, and a stator coil 14 is installed as a current carrying conductor of the stator 2. The stator 2 has a stator core 12 made up of a stack of magnetic steel sheets laminated in the axis direction.

Within the stator 2, stator cooling ducts 13 are installed as radial ventilation passages for directing a later-described cooling medium 6 toward the inside of the stator 2. Within the stator 2, there are: forward zones 16 which is an area where the cooling medium 6 flows through the stator cooling duct 13 form the inner diameter side toward the outer diameter side; and reverse zones 17 which is an area where, in reverse, the cooling medium 6 flows the outer diameter side toward the inner diameter side. Within the stator frame 1, a ventilation pipe 18 is installed for fluid communication between the forward zones 16 and between the reverse zones 17.

An axial flow fan 5 is placed at an end of the rotor shaft 4, so that the cooling medium 6 is blown into each area in the turbine generator by the axial flow fan 5 as indicated by arrows in FIG. 11. A sub-slot 7 is an axial ventilation passage for directing the cooling medium 6 into the rotor 3. Radial passages 9 are radial ventilation passages for directing the cooling medium from the sub-slot 7 toward the field coil 8. Outlet openings 10 are formed in the outer surface of the rotor 3. A cooler 15 is possessed to cool the cooling medium which has risen in temperature by cooling each area.

In the turbine generator 30 configured as described above, upon rotation of the rotor 3, the cooling medium 6 flows into the sub-slot 7 by the pushing action of the axial flow fan 5 and the centrifugal force in the radial passage 9. Further, a portion of the cooling medium 6 flows from the axial flow fan 5 into the air gap 11 and toward the end of the stator coil 14. The cooling medium 6 flowing into the sub-slot 7 flows further toward the center of the rotor 3 while branching sequentially into the radial passages 9, so that the field coil 8 is cooled in each radial passage 9. Then, the cooling medium 6 is exhausted from the outlet openings 10 into the air gap 11.

The portion of the cooling medium 6, which has flown toward the end of the stator coil 14, flows through a ventilation pipe 18B between the reverse zones 17 into the stator cooling ducts 13 in each reverse zone 17, which then cools the stator cores 12 and the stator coils 14 in the reverse zone 17. After the cooling, the portion of the cooling medium 6 is exhausted into the air gap 11 to be merged with the cooling medium 6 which has cooled the rotor 3.

The cooling medium 6 merged together in the air gap 11 flows into the stator cooling ducts 13 in the forward zones 16, which then cools the stator cores 12 and the stator coils 14 in the forward zones 16. After the cooling, the cooling medium 6 flows into the cooler 15 through the ventilation pipe 18A between the forward zones 16. After being raised in temperature by cooling each heat-producing area, the cooling medium 6 is decreased in temperature by the cooler 15, and then flows back to the axial flow fan 5, thus completing one circulation. In this manner, the cooling medium 6 is circulated throughout the machine in order to cool the heat-producing areas such as the coil and the like.

Figure 12:
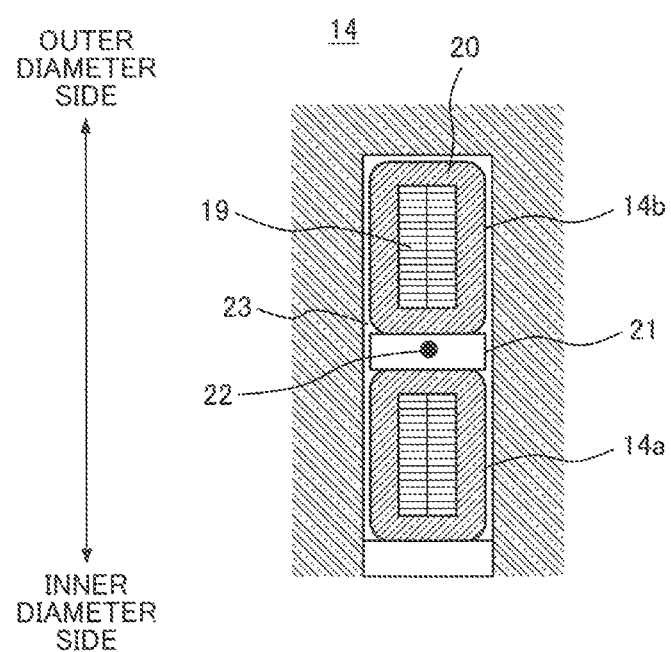
FIG. 12 is a schematically sectional view illustrating the stator coil in FIG. 11.

Next, a method of monitoring the coil temperature is described with reference to FIG. 12. A description is made herein by using the stator coil 14 as an example, and the same is applied to other coils such as the field coil 8 and the like. FIG. 12 is a schematically sectional view of a stator coil, which illustrates a section (radial-circumferential section) of the stator coil 14. As illustrated in FIG. 12, the stator coil has an upper coil 14a and a lower coil (bottom coil) 14b placed in a coil housing (slot) 23 mounted in the stator core 12. The upper coil 14a and the lower coil 14b each have a strand (conductor) 19 through which current passes, and an insulating layer 20 placed around the strand 19. In each of the upper coil 14a and the lower coil 14b, a plurality of wires composing the strands 19 are arranged in multiple rows and multiple columns. An intermediate layer 21 is placed between the upper coil 14a and the lower coil 14b, and in turn an in-coil temperature sensor 22 (e.g., resistance thermometer bulb) for measuring temperature is placed in the intermediate layer 21.

The stator coil 14 has the insulating layer 20 placed on the outer periphery of the strand 19 for the purpose of ensuring electrical insulation. Degradation proceeds under long-term operation, and then the insulating layer 20 may decrease in insulation performance, which may likely produce a dielectric breakdown. To address this, conventionally, for the purpose of preventing an unscheduled stop of the turbine generator from being caused by the dielectric breakdown of the insulating layer 20, a method for monitoring temperature rise is employed in which the temperature of the insulating layer 20 is calculated from a measured value of the temperature of the stator coil 14 by use of the in-coil temperature sensor 22. FIG. 12 illustrates the example of the in-coil temperature sensor 22 being placed in the intermediate layer 21 between the upper coil 14a and the lower coil 14b. In this case, the temperature of the insulating layer 20 in contact with the intermediate layer 21 is indirectly measured from the temperature of the intermediate layer 21. As compared with an early stage of the operation, when a measured value of the in-coil temperature sensor 22 is increased after a long period of operation, it is determined that the degradation of the insulating layer 20 proceeds. A permissible temperature is decided during the design stage, so that the state of health of the insulating layer 20 is determined from a comparison with the permissible temperature.

As conventional methods for monitoring temperature, a method is well known in which changes in temperature of the cooling medium 6 around a component of the stator, rather than the component itself, is monitored to determine the presence or absence of anomaly. Also, another method is well known in which the temperature of the coil surface is measured by the in-coil temperature sensor 22 to estimate a degradation condition and the life of the insulating layer 20.

However, the temperature of the stator coil 14 has a distribution in the axis direction (a long axis direction of the rotor shaft 4) depending on a cooling method or a ventilation structure. In particular, as illustrated in FIG. 11, in a type of the cooling medium to flow in multiple directions, the temperature has a more complicated distribution than that in the single type structure to flow the cooling medium in one direction. Because of this, the progress of degradation of the insulating layer 20 varies from area to area. Because of the progress of degradation of the insulating layer 20 is more accelerated under higher temperature environment, a highest-temperature producing area of the stator coil 14 has a highest risk of degradation of the insulating layer 20. If a degradation condition and/or the remaining life of the insulating layer 20 are diagnosed without consideration of the above, the degradation condition may be likely to be underestimated and/or the remaining life may be likely to be overestimated. This fact is not taken into account in conventional temperature monitoring methods.

Accordingly, with consideration of the temperature distribution within a rotating electric machine, the present invention provides a temperature monitoring system and a temperature monitoring method for a rotating electric machine, which enable prediction of a strand temperature from a temperature of a sensor (measured value) installed in the rotating electric machine in order to monitor the temperature of the rotating electric machine with a higher degree of accuracy than the conventional art. The present invention will now be described in detail based on embodiments. Incidentally, like reference signs are used to refer to like components throughout the figures.

First Embodiment

A temperature monitoring system for a rotating electric machine according to a first embodiment will be described with reference to FIG. 1 to FIG. 3. It is noted that the overall configuration of the rotating electric machine itself according to the embodiment is the same as the configuration illustrated in FIG. 11, and a description is omitted in the embodiment.

Figure 1:
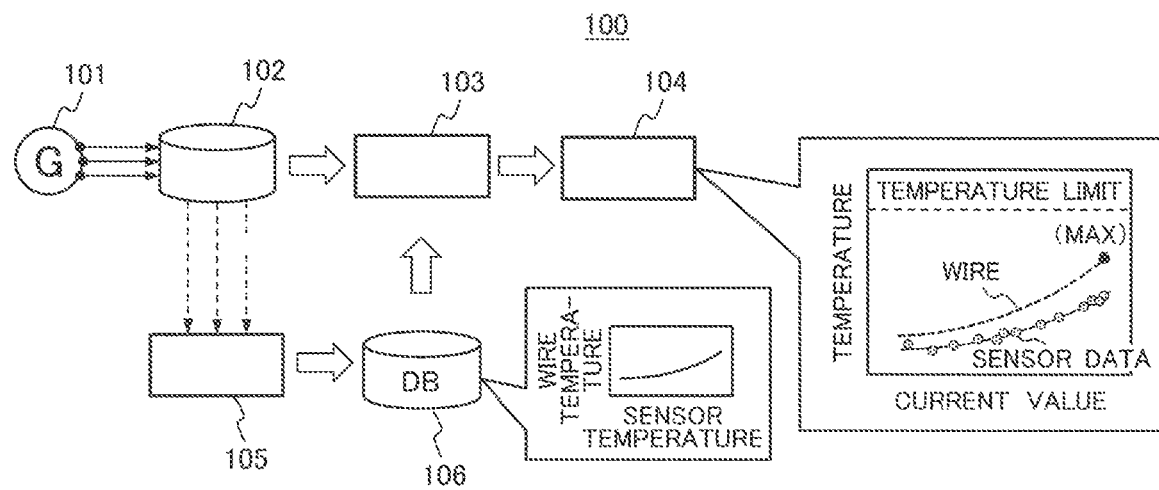
FIG. 1 is a block diagram illustrating a system of monitoring temperature of a rotating electric machine in accordance with a first embodiment.

FIG. 1 is a block diagram illustrating the temperature monitoring system for the rotating electric machine according to the first embodiment. In FIG. 1, the rotating electric machine 101 is described as a turbine generator. Although not shown in FIG. 1, a stator core of the rotating electric machine 101 has intermediate layers 21 as in the case of FIG. 12, and in-coil temperature sensors 22 are placed in the intermediate layers 21. A sensor insensitive to magnetic fields is preferably used for an in-coil temperature sensor 22. A plurality of in-coil temperature sensors installed in the coil will be hereinafter referred to sometimes as a "sensor unit (22)".

As illustrated in FIG. 1, the temperature monitoring system 100 for the rotating electric machine according to the first embodiment has: the rotating electric machine 101; an in-coil temperature sensor installed in a coil of the rotating electric machine; and a physical quantity sensor that is installed within the rotating electric machine 101 to measure a physical quantity (such as a coil current, a temperature of cooling medium, and the like) related to the operation of the rotating electric machine 101. The temperature monitoring system 100 further has: a sensor data storage 102 that stores sensor data (measured values) of the above-described in-coil temperature sensor and physical quantity sensor; an in-machine temperature predictor 105 that uses the sensor data in the sensor data storage 102 to predict in detail an in-machine temperature; a strand temperature calculator 106 that calculates and stores the relationship between the strand temperature and the temperature of the sensor unit on the basis of the in-machine predictor 105; and a strand temperature predictor 103 that predicts a temperature of the strand 19 from the relationship between the measured value of the in-coil temperature sensor stored in the sensor data storage 102 and the data stored in the strand temperature calculator 106. The temperature monitoring system 100 further has a display device 104 for displaying the result of the strand temperature predictor 103. The above devices may be configured to exchange data online with one another via wired or wireless communications or may be offline from one another without having communication functionality.

In sites such as a thermal power plant and the like, for the purpose of monitoring the operating state of the rotating electric machine 101, physical quantities such as a coil current, a temperature of cooling gas and the like are acquired at regular time intervals. In the present invention, the sensor data on such physical quantities representing an operating state is used to predict in detail an in-machine temperature by the in-machine temperature predictor 105. The in-machine temperature predictor 105 is generated by a simulation made by a physical model that models in detail the ventilation in the machine and heat transfer paths, by way of example. According to this approach, the temperatures of the stator coil 14, the field coil 8 and the like can be obtained in detail in accordance with the operating state of the rotating electric machine 101. For sensor data such as on a coil current, a temperature of cooling gas and the like, prediction on temperature in each component may be made either on-line or off-line by the in-machine temperature predictor 105.

Figure 2:
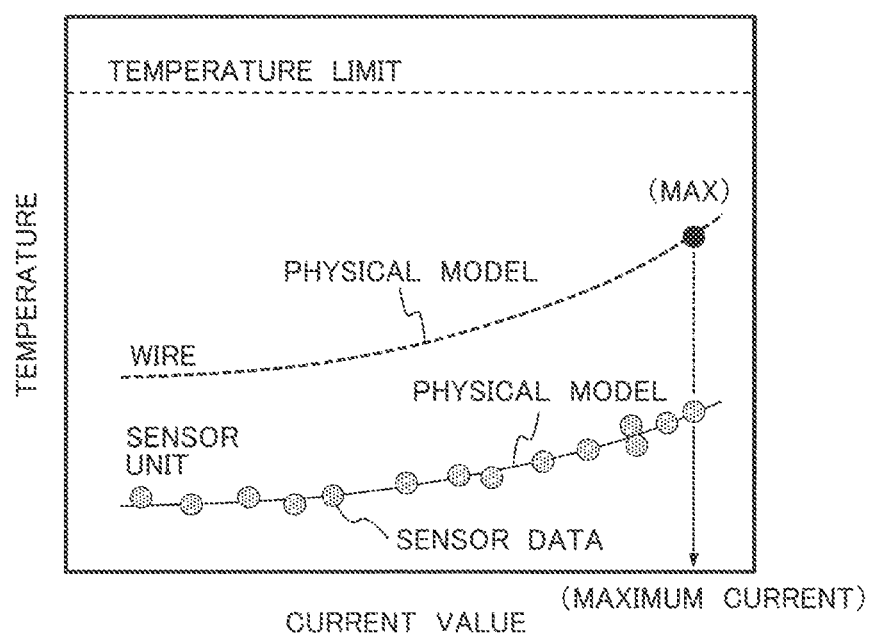
FIG. 2 is a graph showing the relationship between temperature and a coil current value for a sensor unit and a strand, which is created by the temperature monitoring system according to the first embodiment.

FIG. 2 is a graph showing the relationship between temperature and a coil current value for the sensor unit and the strand, which is created by the temperature monitoring system according to the first embodiment. In FIG. 2, a marker (gray dot) indicates a value measured by the in-coil temperature sensor 22; a solid line indicates values predicted on sensor-unit temperature versus coil current values by the in-machine temperature predictor 105 using a physical model; and a broken line indicates values indicated on temperature of the strand 19 versus coil current values by the in-machine temperature predictor 105. Typically, the coil loss increases as the coil current increases, and when the joule loss is dominant, the loss is proportional to the square of the coil current value, so that the coil temperature also increases with the square. With the in-machine temperature predictor 105 according to the present invention, in addition to a temperature in an area where the in-coil temperature sensor 22 is installed, the temperature of the strand 19 is able to be also predicted and evaluated. The prediction accuracy by the physical model can be evaluated by a comparison with a value of the in-coil temperature sensor 22, and using the result for correction enables prediction on the temperature of the strand 19 with high accuracy. The behavior of temperature of the strand 19 with respect to the coil current value as illustrated in FIG. 2 can also be predicted, and therefore a maximum temperature (black dot mark for rated output temperature) of the strand 19 in operation can be predicted.

Because a sensor is not conventionally able to be installed directly on the strand 19 having high temperatures, the temperature of the strand 19 is only able to be indirectly calculated from a temperature of another component in the machine. Also, the sensor temperature is not conventionally corrected based on the in-machine temperature distribution as done in the embodiment. Because of this, it is difficult to predict the temperature of the strand 19 with high accuracy.

In the rotating electric machine, heat-resistant requirements of the insulating layer 20 are set in the design stage, and this must be adhered to. Because the degradation of the insulating layer 20 is more hastened in severer environments, monitoring the behavior of coil maximum temperature is important. According to the embodiment, the maximum temperature of the strand 19 is capable of being predicted in accordance with the operating state with high accuracy, and a margin to the temperature limit is able to be evaluated. Therefore, a further improvement in ensuring of reliability of the products may be achieved.

Figure 3:
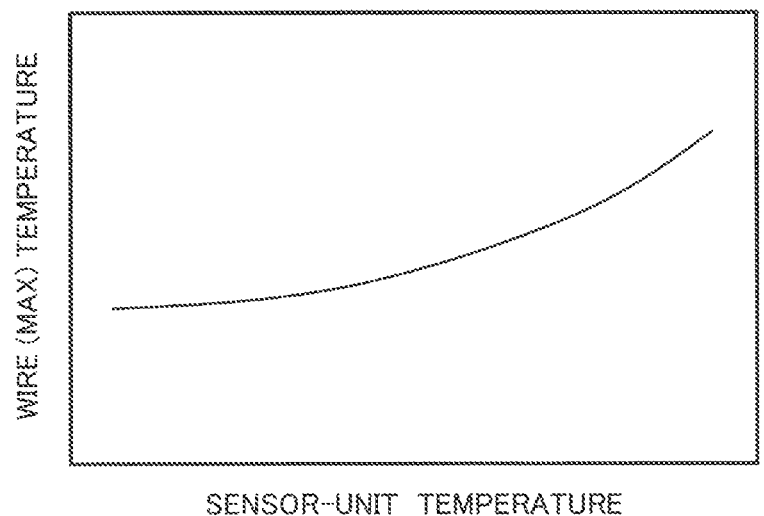
FIG. 3 is a graph showing the relationship between strand maximum temperature and temperature of a sensor unit, which is created by the temperature monitoring system according to the first embodiment.

FIG. 3 is a graph showing the relationship between the strand maximum temperature and the temperature of the sensor unit, which is created by the temperature monitoring system according to the first embodiment. The in-machine temperature predictor 105 according to the embodiment is able to be used to derive a relationship between temperatures of the in-coil temperature sensor 22 and the strand 19, and the relationship can be databased. Using the measured value of the temperature of the in-coil temperature sensor 22 and the data in the strand temperature calculator 106, a maximum temperature of the strand 19 can be calculated by the strand temperature predictor 103. With the method, without performing a simulation using a physical model every time sensor data is acquired, the temperature of the strand 19 can also be predicted in real time in accordance with the operating state. The obtained temperature is displayed on the display device 104, and during comparison with the temperature limit, the temperature behavior of the sensor and the strand 19 can be successively monitored, so that the health of products can be ensured. This enables prevention of an unscheduled stop of the rotating electric machine 101 before it is caused by the dielectric breakdown of the insulating layer 20, leading to improvement in product reliability and service performance to users.

The temperature monitoring system 100 in the embodiment is particularly effective for a type of cooling the strand 19 via the insulating layer 20 (indirect cooling type). This is because this type is inferior in cooling performance as compared with the type of cooling the strand 19 with water (water cooling type), and therefore has a tendency to be raised to high temperature.

Second Embodiment

Figure 4:
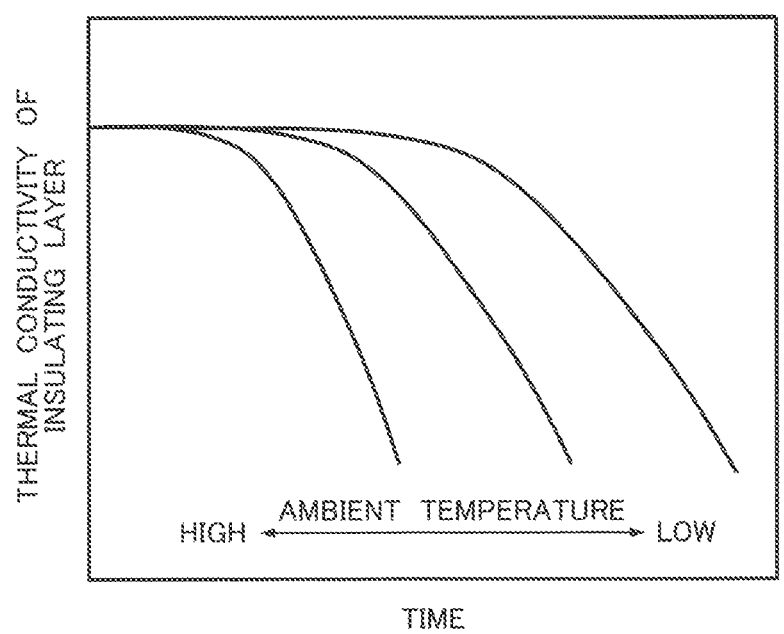
FIG. 4 is a graph showing the change over time in thermal conductivity of an insulating layer.

An approach to evaluating deterioration over time of the rotating electric machine is described in the embodiment. FIG. 4 is a graph showing the change over time in thermal conductivity of the insulating layer. Typically, the insulating layer 20 is composed of a mixture material of resin, glass cloth and mica. If the insulating layer 20 is used under a certain temperature environment over the long time, the resin fill factor is reduced, leading to degradation in insulation performance. This is degradation of insulation. In step with the reduction of the resin fill factor, voids occur in the insulating layer 20, so that the thermal conductivity is reduced. The reduction in thermal conductivity of the insulating layer 20 causes a reduction in cooling performance of the rotating electric machine 101, and in turn the temperature of the strand 19 is affected.

Figure 5:
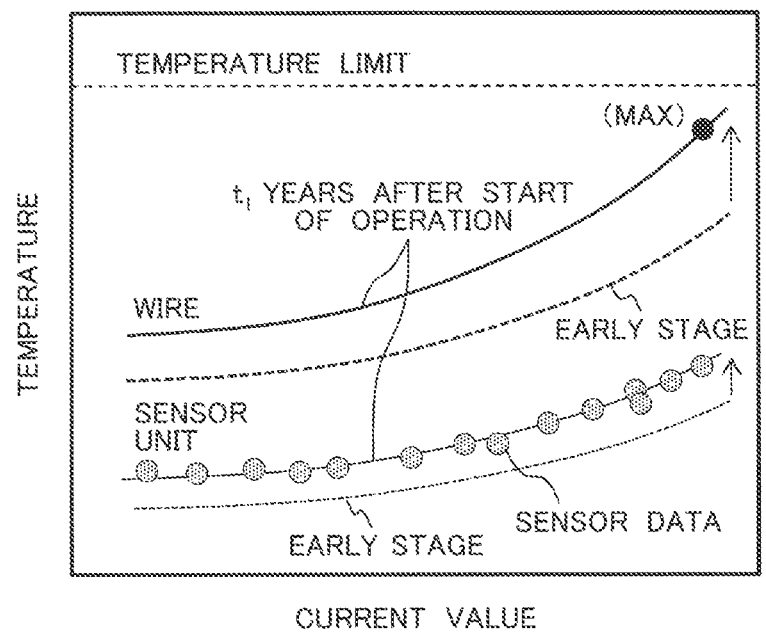
FIG. 5 is a graph showing the relationship between temperature and a coil current value for a sensor unit and a strand, which is created by a temperature monitoring system according to a second embodiment.

FIG. 5 is a graph showing the relationship between temperature and a coil current value for the sensor unit and the strand, which is created by the temperature monitoring system according to the second embodiment. As illustrated in FIG. 5, if the rotating electric machine 101 is continued to be operated, as described earlier, the degradation of the insulating layer 20 continues to progress. Thus, in $t_1$ years after start of operation (e.g., $t_1$=a year, five years or ten years), the in-coil temperature sensor 22 and the strand 19 are also raised to higher temperatures as compared with the early stage. In an occurrence of a deviation (temperature rise as shown by the arrows in FIG. 5) of a value which is measured by the in-coil temperature sensor 22 after $t_1$ years, from a predicted value of the in-coil temperature sensor 22 which is predicted by the in-machine temperature predictor 105 using a physical model in the early stage of operation, it is conceivable that the degradation of the insulating layer 20 progresses and the thermal conductivity is reduced. In this event, using a difference between the temperature in the early stage of operation and the temperature after $t_1$ years, the temperature characteristics of the strand 19 calculated on the conditions in the early stage operation is recorrected. This enables allowance to be made for the influence of a reduction in thermal conductivity on the temperature of the strand 19, the reduction in thermal conductivity being caused by thermal degradation over time of the insulating layer 20.

Figure 6:
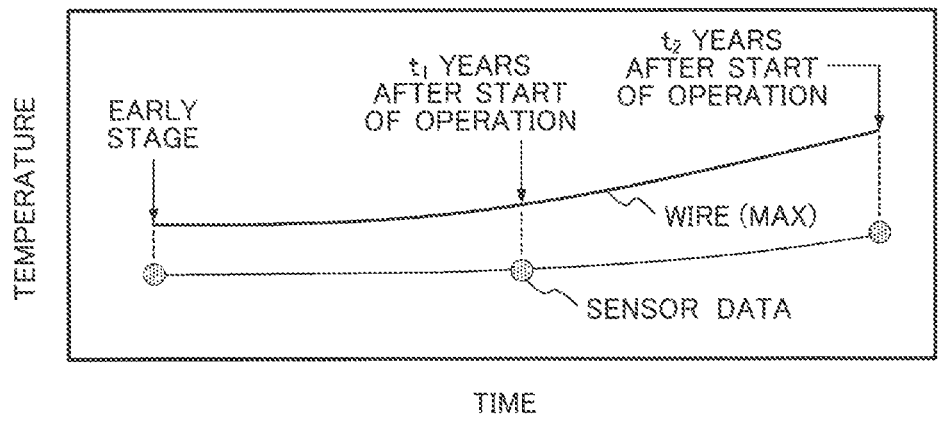
FIG. 6 is a graph showing an example of the change over time in temperature of the sensor unit and the strand, which is created by the temperature monitoring system according to the second embodiment.

FIG. 6 is a graph showing an example of the change over time in temperature of the sensor unit and the strand, which is created by the temperature monitoring system according to the second embodiment. According to the embodiment, it is possible to predict changes with time while the maximum temperature of the sensor unit or the strand 19 increases by the degradation over the time of the insulating layer 20.

Third Embodiment

Figure 7:
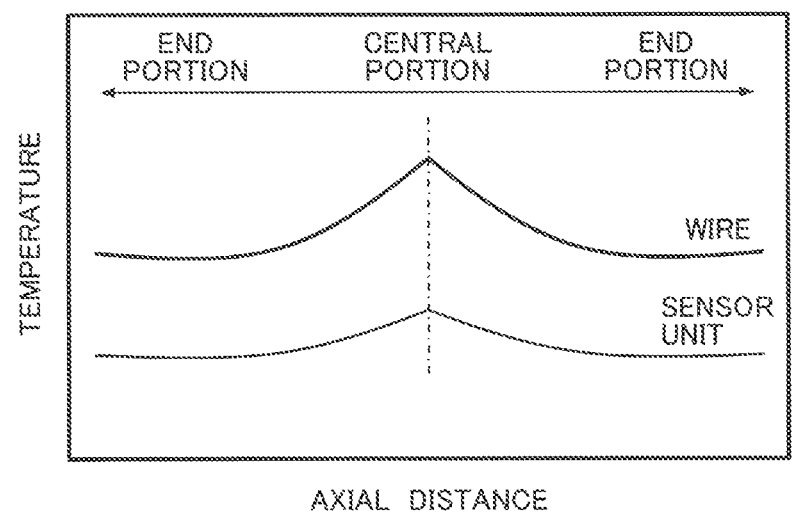
FIG. 7 is a graph showing temperature distribution in the axis direction of a stator coil 14.

In the embodiment, an approach to evaluating degradation of each area of the rotating electric machine is described. FIG. 7 is a graph showing temperature distribution in the axis direction of the stator coil 14. As illustrated in FIG. 7, temperatures of the in-coil temperature sensor 22 and the strand 19 may have distributions in the axis direction because of a difference in cooling performance caused by ventilation structure. In the embodiment, an example where the temperature is low at an end portion and rises toward the center is shown. In the case of such a temperature distribution, the insulating layer 20 is under temperature environments varying from area to area, and therefore the progress of degradation also varies. As illustrated in FIG. 4, the higher the environmental temperature, the earlier the progress of degradation of the insulating layer 20, so that the thermal conductivity is reduced earlier. If the thermal conductivity is reduced due to the degradation of the insulating layer 20, then the strand 19 rises in temperature, leading to further acceleration of degradation. This may likely become increasingly salient in a higher temperature area under a severe temperature environment.

Figure 8:
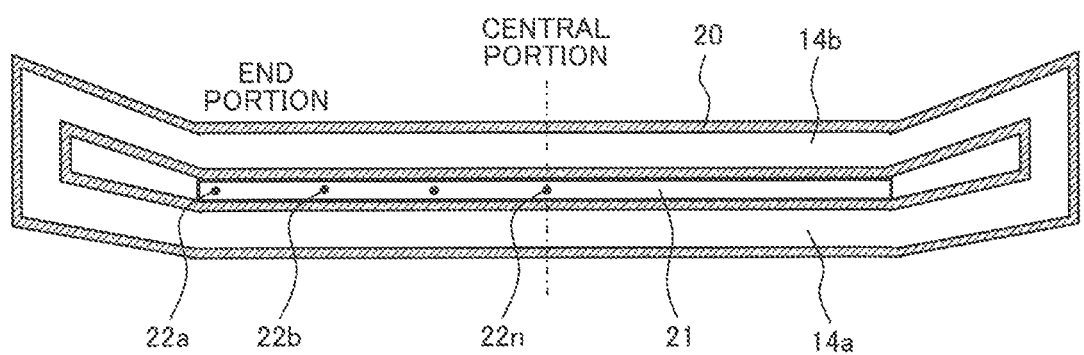
FIG. 8 is a schematically sectional view illustrating example placement of temperature sensors according to a third embodiment.

FIG. 8 is a schematically sectional view illustrating example placement of temperature sensors according to a third embodiment. FIG. 8 is a radial-axial sectional view of the stator coil 14, in which a plurality of in-coil temperature sensors 22 (22a, 22b, . . . , 22n) are arranged in the axis direction of the intermediate layer 21. This enables temperature measurement in the axis direction of the sensor unit. In the early stage of operation, the thermal conductivity is equal in all areas in the insulating layer 20. However, in the central portion raised to high temperature, the degradation of the insulating layer 20 progresses earlier than the end portion at lower temperature, and in turn the thermal conductivity is reduced early to cause a coil temperature rise.

Figure 9:
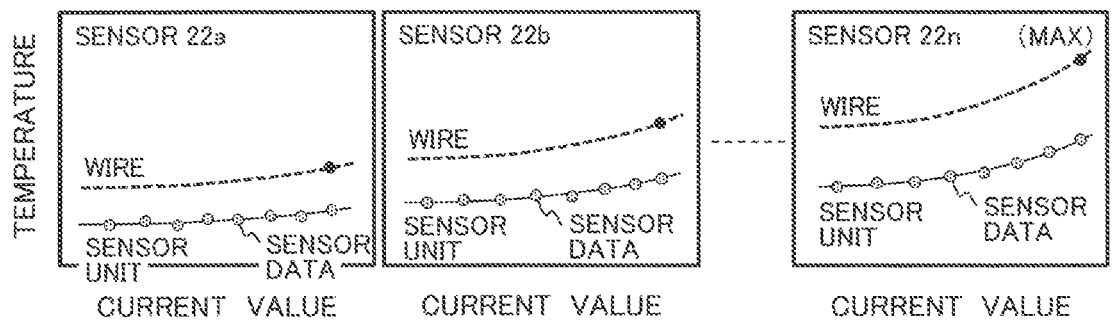
FIG. 9 shows graphs each showing the relationship between temperature and a coil current value for a sensor unit and a strand, which is created by a temperature monitoring system according to the third embodiment.

FIG. 9 shows graphs each showing the relationship between temperature and a coil current value for the sensor unit and the strand, which is created by a temperature monitoring system according to the third embodiment. In FIG. 9, the relationship between coil temperature and a coil current value for each sensor is plotted in graph form. According to the present invention, arranging a plurality of temperature sensors in the axis direction enables the grasping of the progress of degradation of the insulating layer 20 for each area in the stator coil. Also, using the in-machine temperature predictor 105 based on a physical model enables high-accurate prediction on the maximum temperature of the strand 19 in consideration of a difference in progress of the insulating layer 20 among areas in the stator coil.

In the present invention, the structure in which a plurality of temperature sensors is arranged in the axis direction is illustrated. However, a maximum-temperature producing area may be pre-localized using the in-machine temperature predictor 105 based on a physical model, and a plurality of temperature sensors may be arranged in the axis direction in the range including the maximum-temperature producing area. With the structure, the number of installation points of the temperature sensors is able to be minimized and the maximum temperature of the strand 19 in an area where the degradation of the insulating layer 20 progresses earlier can be predicted.

Fourth Embodiment

Figure 10:
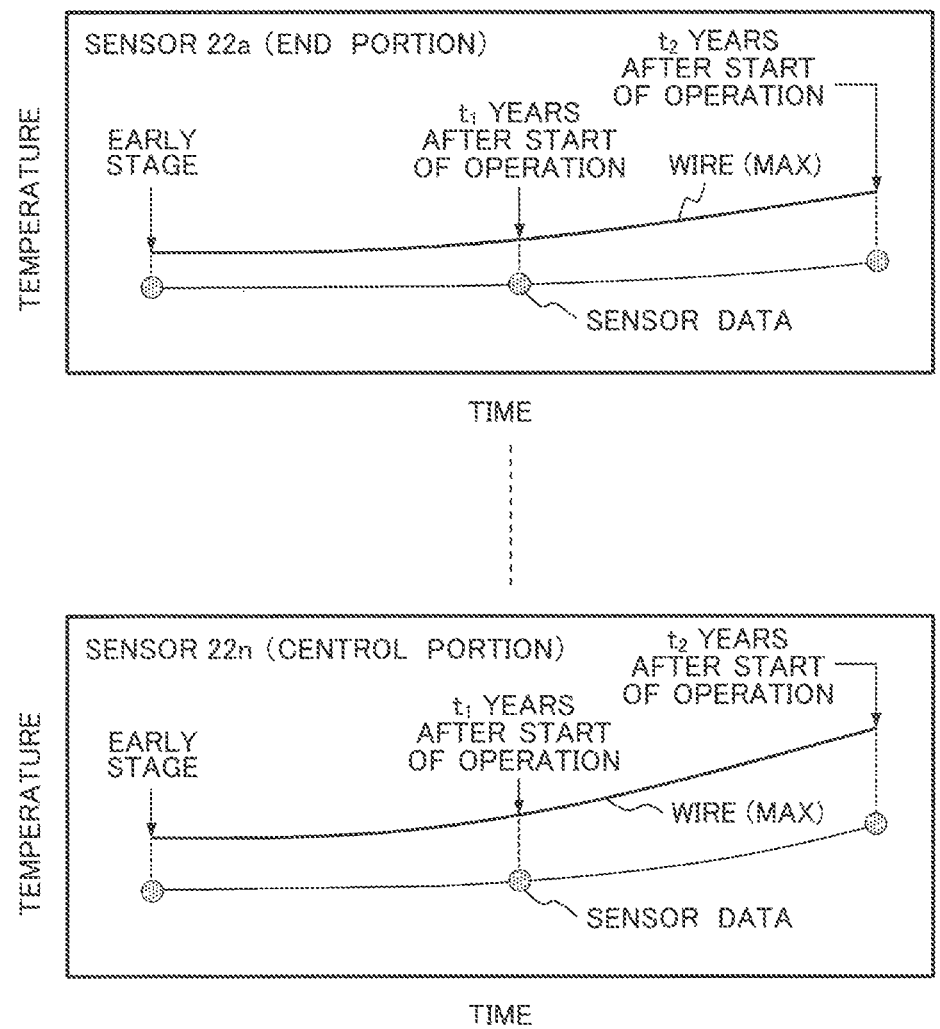
FIG. 10 shows graphs each showing an example of the change over time in temperature of a sensor unit and a strand, which is created by a temperature monitoring system according to a fourth embodiment.

FIG. 10 shows graphs each showing an example of the change over time in temperature of a sensor unit and a strand, which is created by a temperature monitoring system according to a fourth embodiment. The embodiment has a configuration of a combination of the second embodiment and the third embodiment. Specifically, a plurality of sensors is placed in the stator coil 14 and, based on the temperature of each sensor, a prediction is made on a change over time in temperature of the sensor unit and the strand. According to the embodiment, a prediction is able to be made on a time point at which the temperature limit is reached by the maximum temperature of the strand in the coil central portion suffering particularly severe temperature. As a result, the reliability of the rotating electric machine is increased and the timing of maintenance can be scheduled early.

As described above, according to the present invention, it is shown to provide a temperature monitoring system and a temperature monitoring method for a rotating electric machine in which a temperature rise within the rotating electric machine is capable of detected with high accuracy to achieve further advanced ensuring of the product reliability.

It should be understood that the present invention is not limited to the above embodiments and various modifications are embraced. For example, the above embodiments have been described in detail for the purpose of explaining the present invention clearly, and the present invention is not necessarily limited to including all the configurations described above. Also, a part of the configuration of an embodiment may be replaced with the configuration of another embodiment, and the configuration of an embodiment may be added to the configuration of another embodiment. Also, a part of the configuration of each embodiment may be added to, removed from, and substituted for another configuration.

LIST OF REFERENCE SIGNS

1 ... Stator frame
2 ... Stator
3 ... Rotor
4 ... Rotor shaft (shaft)
5 ... Axial flow fan
6 ... Cooling medium
7 ... Sub-slot
8 ... Field coil
9 ... Radial passage
10 ... Outlet opening
11 ... Air gap (interstice)
12 ... Stator core
13 ... Stator cooling duct
14 ... Stator coil
14a ... Upper coil
14b ... Lower coil
15 ... Cooler
16 ... Forward zone
17 ... Reverse zone
18 ... Ventilation pipe
19 ... Strand
20 ... Insulating layer
21 ... Intermediate layer
22 ... In-coil temperature sensor
100 ... Temperature monitoring system in First Embodiment
101 ... Rotating electric machine
102 ... Sensor data storage
103 ... Strand temperature predictor
104 ... Display device
105 ... In-machine temperature predictor
106 ... Strand temperature calculator

What is claimed is:

1. A system for monitoring temperature of a rotating electric machine, comprising:
   a coil that has a strand for passing a current through the coil forming part of the rotating electric machine, and an insulating layer placed around the strand;
   at least one in-coil temperature sensor that is placed within the coil;
   a physical quantity sensor that is placed within the rotating electric machine and measures a physical quantity related to operation of the rotating electric machine;
   a sensor data storage that stores values measured by the at least one in-coil temperature sensor and the physical quantity sensor;
   an in-machine temperature predictor that predicts a temperature inside the rotating electric machine by use of the value measured by the physical quantity sensor and stored in the sensor data storage;
   a strand temperature calculator that calculates a relationship between a temperature of the strand and a temperature measured by the at least one in-coil temperature sensor, on the basis of the temperature inside the rotating electric machine predicted by the in-machine temperature predictor; and
   a strand temperature predictor that predicts a temperature of the strand from the value measured by the at least one in-coil temperature sensor and stored in the sensor data storage, and from the relationship between a temperature of the strand and a temperature measured by the at least one in-coil temperature sensor calculated by the strand temperature calculator.

2. The system for monitoring temperature of a rotating electric machine according to claim 1, further comprising a display device that successively displays a relationship between a temperature measured by the at least one in-coil temperature sensor and a maximum temperature of the strand predicted by the strand temperature predictor.

3. The system for monitoring temperature of a rotating electric machine according to claim 1,
   wherein the strand temperature calculator calculates a change over time in measured temperature measured by the at least one in-coil temperature sensor, and
   the strand temperature predictor predicts a change over time in temperature of the strand on the basis of the change over time.

4. The system for monitoring temperature of a rotating electric machine according to claim 1,
   wherein the at least one in-coil temperature sensor includes a plurality of in-coil temperature sensors placed within the coil,
   the strand temperature calculator calculates a relationship between a temperature of the strand and a temperature measured by the at least one in-coil temperature sensor for each of the plurality of in-coil temperature sensors, and
   the strand temperature predictor predicts a temperature of the strand from the relationship between a temperature of the strand and temperatures measured by each of the plurality of in-coil temperature sensors thus calculated by the strand temperature calculator, and the strand temperature predictor predicts a temperature distribution in the strand within the coil.

5. The system for monitoring temperature of a rotating electric machine according to claim 1, wherein the at least one in-coil temperature sensor includes a plurality of in-coil temperature sensors arranged from a center of the coil toward an end portion of the coil along a radial direction of the coil.

6. The system for monitoring temperature of a rotating electric machine according to claim 1,
   wherein the coil has the strand, a plurality of coil members including an insulating layer placed around the strand, and an intermediate layer placed between coil members of the plurality of coil members, and
   the at least one in-coil temperature sensor is placed in the intermediate layer.

7. The system for monitoring temperature of a rotating electric machine according to claim 1, wherein the physical quantity includes a current value of the coil and a value of a temperature of a cooling medium flowing through the rotating electric machine.

8. A method for monitoring temperature of a rotating electric machine, comprising the steps of:
   measuring a temperature by at least one in-coil temperature sensor that is installed in a coil having a strand for passing a current through the coil forming part of the rotating electric machine, and an insulating layer placed around the strand;
   measuring a physical quantity related to operation of the rotating electric machine, by a physical quantity sensor that is placed within the rotating electric machine;
   predicting a temperature inside the rotating electric machine using a value measured by the physical quantity sensor;
   calculating a relationship between a temperature of the strand and a temperature measured by the at least one in-coil temperature sensor, on the basis of the temperature inside the rotating electric machine predicted; and
   predicting a temperature of the strand from the temperature measured by the at least one in-coil temperature sensor, and from the relationship between a temperature of the strand and a temperature measured by the at least one in-coil temperature sensor, the relationship being calculated.

9. The method for monitoring temperature of a rotating electric machine according to claim 8, further comprising the step of successively displaying a relationship between a temperature measured by the at least one in-coil temperature sensor and a maximum temperature of the strand predicted.

10. The method for monitoring temperature of a rotating electric machine according to claim 8,
wherein when the relationship between a temperature of the strand and a temperature measured by the at least one in-coil temperature sensor is calculated on the basis of the temperature inside the rotating electric machine, a change over time in measured temperature measured by the at least one in-coil temperature sensor is calculated, and
a change over time in temperature of the strand is predicted on the basis of the change over time.

11. The method for monitoring temperature of a rotating electric machine according to claim 8,
wherein the at least one in-coil temperature sensor includes a plurality of in-coil temperature sensors placed within the coil,
a relationship between a temperature of the strand and a temperature measured by the at least one in-coil temperature sensor is calculated for each of the plurality of in-coil temperature sensors, and
a temperature of the strand is predicted from the relationship between a temperature of the strand and temperatures measured by each of the plurality of in-coil temperature sensors thus calculated, and a temperature distribution in the strand within the coil is predicted.

12. The method for monitoring temperature of a rotating electric machine according to claim 8, wherein the at least one in-coil temperature sensor includes a plurality of in-coil temperature sensors arranged from a center of the coil toward an end portion of the coil along a radial direction of the coil.

13. The method for monitoring temperature of a rotating electric machine according to claim 8,
wherein the coil has the strand, a plurality of coil members including an insulating layer placed around the strand, and an intermediate layer placed between coil members of the plurality of coil members, and
the at least one in-coil temperature sensor is placed in the intermediate layer.

14. The method for monitoring temperature of a rotating electric machine according to claim 8, wherein the physical quantity includes a current value of the coil and a value of a temperature of a cooling medium flowing through the rotating electric machine.

\* \* \* \* \*